VEHICLE FLUSH TOILET

Original Filed Dec. 9, 1966 4 Sheets-Sheet 1

INVENTORS
Thomas Carmichael
Durrell U. Howard

BY Moore & Hall

ATTORNEYS

VEHICLE FLUSH TOILET

Original Filed Dec. 9, 1966 4 Sheets-Sheet 2

INVENTORS

Thomas Carmichael
Durrell U. Howard

BY

Moore & Hall ATTORNEYS

VEHICLE FLUSH TOILET

Original Filed Dec. 9, 1966 4 Sheets-Sheet 3

INVENTORS
Thomas Carmichael
Durrell U. Howard

BY Moore & Hall

ATTORNEYS

VEHICLE FLUSH TOILET

Original Filed Dec. 9, 1966 4 Sheets-Sheet 4

INVENTORS

Thomas Carmichael
Durrell U. Howard

BY Moore & Hall

ATTORNEYS

United States Patent Office

Re. 27,833
Reissued Dec. 11, 1973

27,823

VEHICLE FLUSH TOILET

Thomas Carmichael and Durrell U. Howard, San Antonio, Tex., assignors to Sherwood Products Corporation, San Antonio, Tex.

Original No. 3,418,664, dated Dec. 31, 1968, Ser. No. 600,437, Dec. 9, 1966. Application for reissue May 5, 1971, Ser. No. 140,426

Int. Cl. E03d *5/016*

U.S. Cl. 4—115 19 Claims

Matter enclosed in heavy brackets [ ] appears in the original patent but forms no part of this reissue specification; matter printed in italics indicates the additions made by reissue.

ABSTRACT OF THE DISCLOSURE

The disclosure relates to a flush toilet for vehicles or the like. A storage receptacle receives waste from a bowl with which it communicates when an intervening shutter is open. During the flushing cycle, the shutter is closed and flushing fluid is pumped from a separate reservoir to the bowl and thence back to the reservoir, bypassing the receptacle.

This invention relates to a flush toilet for use in vehicles or the like, and is particularly adapted for use in aircraft, boats, trailers, etc. The toilet of this invention is of the type having a waste storage compartment which is periodically emptied as, for example, at the end of a trip. More particularly, the invention relates to a vehicle toilet of the flush type which requires the use of only a relatively small quantity of flushing fluid, which flushing fluid may be used repeatedly without becoming appreciably contaminated.

With the increasing emphasis on avoidance of pollution of streams and lakes, it is becoming mandatory in many localities to provide a toilet for use on boats, camping trailers, and the like which is so constructed as to prohibit absolutely the discharge of waste material, and particularly human waste material, from such vehicles. Although vehicle toilets have been developed and are in use, for example in aircraft which are of the flush type and provide for storage of the waste material until it can be removed from the toilet, such toilets of the prior art have numerous disadvantages. For example, in the toilets in common use in modern day aircraft, flushing water is provided and also means for separating solid waste materials from liquid waste materials; however, no means is provided for separating the liquid waste materials from the flushing water with the result that the flushing water becomes grossly contaminated after only several uses of the toilet. Even though such toilets employ means for chemically treating the flush water, it is common for the flush water to become contaminated very quickly despite such treatment with the result that a very unsanitary and odorous condition soon occurs.

Described briefly, the vehicle toilet of the present invention provides for a storage compartment or reservoir for a flushing medium such as water, and a separate compartment or receptacle for the storage of both solid and liquid waste materials. After each use, the bowl is flushed, but the flushing water is maintained substantially isolated from the storage receptacle so that a relatively small quantity of flushing water may be used over and over with only a minimal amount of contamination resulting. Because of this, the toilet of this invention is maintained in an entirely sanitary condition throughout repeated usage and is also substantially entirely free of odor. In addition, the construction of the toilet of this invention is such that removal of the waste material at the end of a trip is very readily accomplished and only a minimal amount of treatment is required to reinstate the toilet to a condition suitable for use on a subsequent trip.

It is accordingly an object of this invention to provide a toilet suitable for use in vehicles and the like which is maintained in a sanitary and non-odorous condition throughout repeated usage.

It is a further object of this invention to provide a toilet for use in vehicles or the like which can be quickly and conveniently cleaned at the end of a trip.

It is a further object of this invention to provide a toilet for use in vehicles or the like which requires only a relatively small quantity of flush water, which flush water remains substantially non-contaminated even after repeated uses of the toilet.

It is a further object of this invention to provide a toilet for use in vehicles or the like which is so constructed that the flush water is kept substantially free of contact with human waste.

Other objects, purposes, and characteristic features of the invention will in part be obvious from the drawings and will in part become obvious as the description of the invention progresses.

In describing the invention, reference will be made to the accompanying drawings in which.

Figure 1:
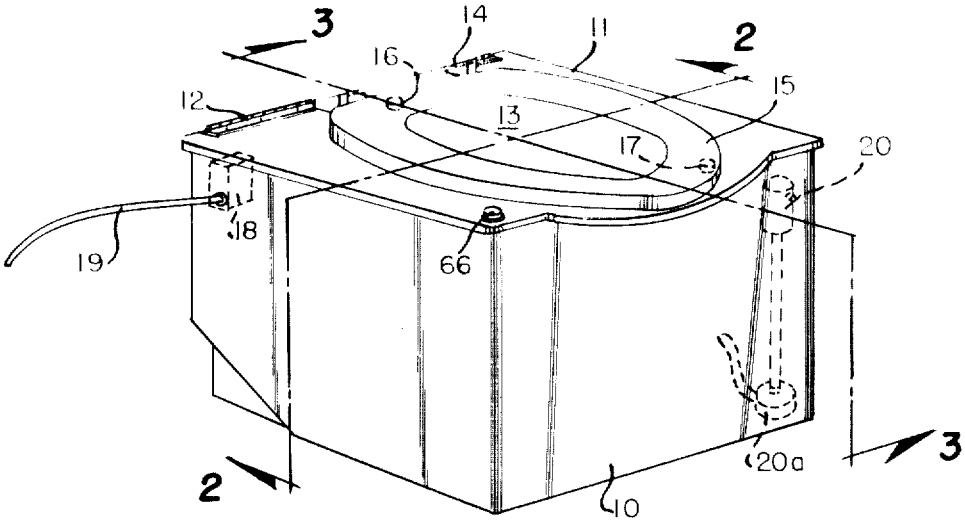
FIGURE 1 is a view, in perspective, of the toilet of the present invention.

Referring to FIGURE 1, the toilet of the present invention is shown as comprising an oblong container or casing 10 which may be formed of metal or plastic or any other suitable material having a lid or member 11 which is hinged to container 10 by means of hinge 12. Lid 11 defines a central aperture therein at 13, and fitted to the top of lid 11 and hinged thereto by means of hinge 14 so as to surround the central aperture 13 is a seat 15. Positioned within the seat 15 are switches 16 and 17, with switch 16 being responsive to the position of the seat, i.e. in a raised or lowered position, and switch 17 being actuated in accordance with whether a downward force is being exerted upon the seat 15. Positioned within the container 10 is a programmer 18 which receives electrical energy via power cord 19. In the right front interior portion of the container 10 is positioned the pump 20 whose sump 20a is immersed in the flush water reservoir 35 as will be seen hereinafter.

Figure 2:
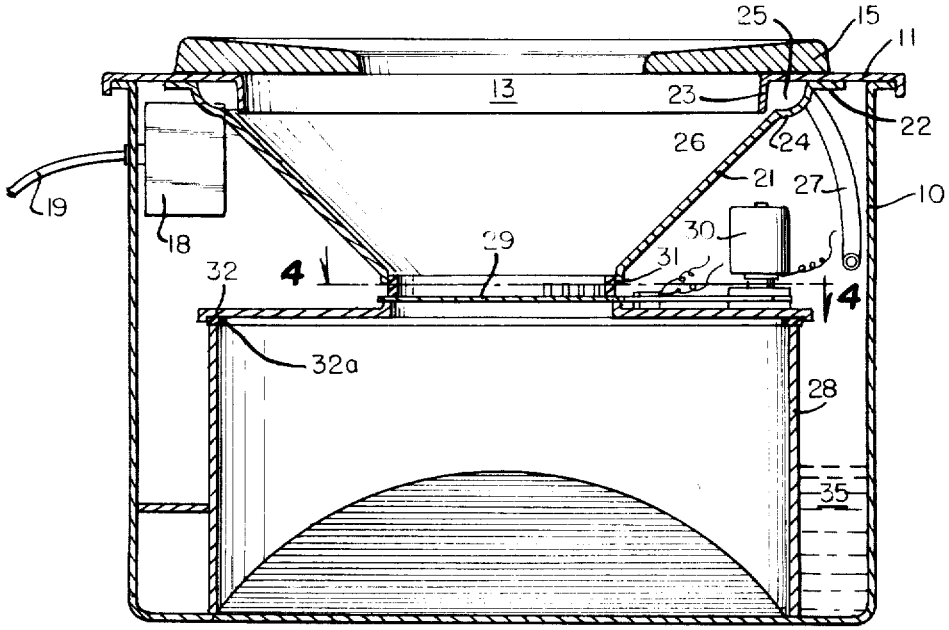
FIGURE 2 is a sectional view of the toilet of FIGURE 1 taken along the line 2—2 shown in FIGURE 1.

The sectional view of FIGURE 2 discloses as annular bowl member 21 whose upper rim 22 is secured to the inner surface of lid 11. As shown, the central aperture 13 is defined in lid 11 by means of a down-turned rim 23 which, together with the curved portion 24 of bowl 21 forms an annular space 25 which communicates with the interior of bowl 21 through the small annular recess 26. By means of this arrangement, flush water is forced through the hose or tube 27 from pump 20 (FIGURE 1) and into the annular space 25 is carried in a swirling fashion around the annular space 25 and thence downwardly through aperture 26 so as to rinse the entire inner surface of bowl 21.

The interior of bowl 21 is capable of communicating with a solid and liquid waste receptacle or chamber 28 dependent upon the position of a shutter 29 which is normally maintained in a closed position by means of an actuating motor 30 which is mounted upon the upper surface of cover 32. Straps 33 connect cover 32 to lid 11, and, because of this, the raising of lid 11 lifts bowl 21 and also lid 32, thereby exposing the interior of receptacle 28 and facilitating the removal of waste materials therefrom. A gasket 32a is affixed to cover 32 to permit an effective sealing engagement between mating surfaces of receptacle 28 and cover 32. This prevents the escape of noxious odors from receptacle 28 and also prevents any of the contents of receptacle 28 from sloshing over and thereby contaminating the flush water as could otherwise readily occur in operation of the associated vehicle. Preferably, a plastic liner (not shown) is employed within receptacle 28 so that all waste material, both liquid and solid, may be readily removed and disposed of.

Figure 3:
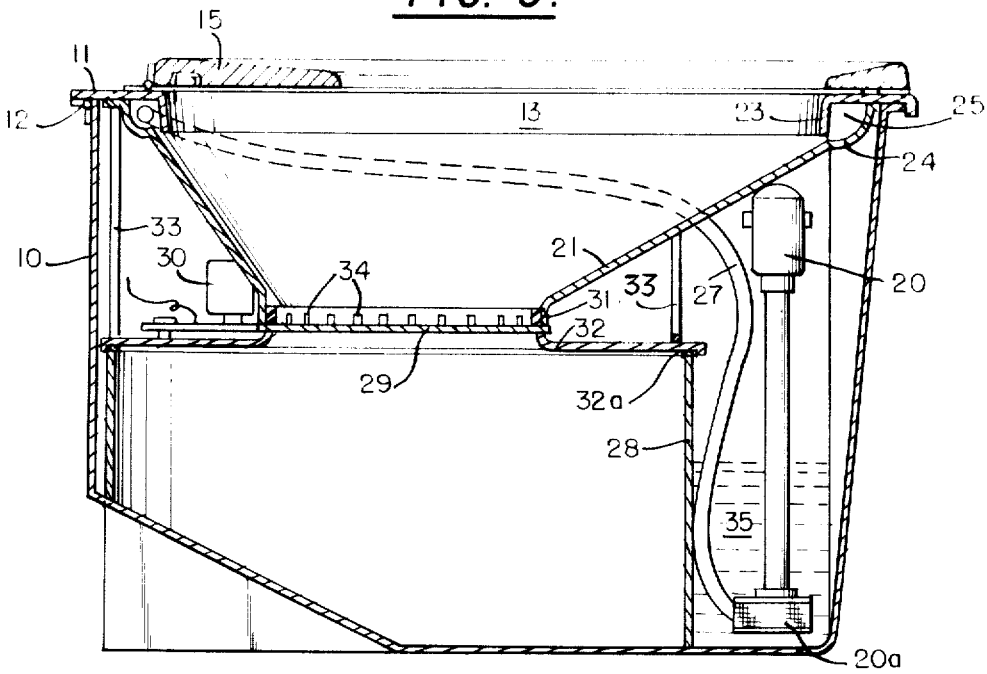
FIGURE 3 is a further sectional view of the toilet of FIGURE 1 taken along the section line 3—3.

Referring now to FIGURE 3, this figure as well as FIGURE 2 shows that the annular space surrounding the receptacle 28 but within the walls of container 10 forms a storage space for flushing fluid which may comprise water alone or, if desired, water together with a suitable disinfectant. The sump 20a of pump 20 is immersed in this flush fluid, and FIGURE 3 shows that the outlet tube or hose 27 from the pump is connected to the annular chamber 25 in such a manner that the discharging fluid from tube 27 will flow substantially tangentially from the outlet end of tube 27 within the annular recess 25.

FIGURES 2 and 3 also show that an annular member or element 31, which is preferably formed of a flexible material such as rubber, is affixed to the bottom discharge opening of bowl 21 in any suitable manner as, for example with a suitable adhesive. The member 31 is provided over a portion of its circumference with apertures 34 which are of such a size that they permit flush water which is admitted to the interior of bowl 21 to pass therethrough and out over the outer top wall 32 of receptacle 28 to the flush water reservoir 35. The apertures 34 are sufficiently large so that the entire quantity of flush water which is used during a flushing operation may quickly pass out through the plurality of apertures 34 back to the flush water reservoir 35, but are small enough so that any solid waste and tissue paper will not pass therethrough but will instead be retained upon the upper surface of the shutter 29.

Since member 31 is formed preferably of a resilient material as described above, and since shutter 29 when closed has its upper surface bearing directly against the lower annular rim of member 31, it is apparent that the opening of shutter 29 will cause any solid material lying thereon to be swept off by such rim, thereby causing such solid material to fall into receptacle 28.

As is apparent from FIGURES 2 and 3, the apertures 34 in member 31 are provided over only a portion of the circumference, and the reason for this is that this tends to produce a current of flush water over the surface of shutter 29 in a direction toward the apertures 34 so that any tissue paper or the like which rests upon the upper surface of shutter 29 or is washed thereupon during the flushing action will be flushed toward the apertures 34 and thus act as a filter to permit the liquid flush water to pass therethrough while retaining any solid waste which may have been removed from the bowl surface during the flushing operation.

Figure 4:
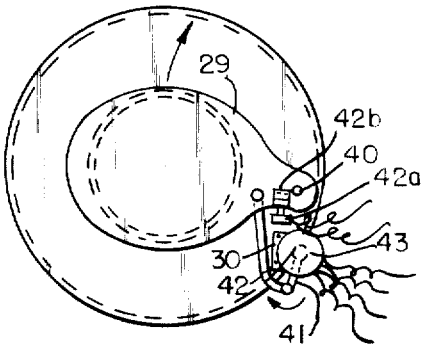
FIGURE 4 is a view of the closure slide which, when in closed position, seals the bowl from the waste receptacle.

The mechanism for actuating the shutter 29 is illustrated in FIGURE 4. The shutter element 29 is rotatable about a pivot 40 by means of actuating members 41 and 42, each of which is operated in response to rotation of motor 30. Motor 30 is of the type known as a torque motor which rotates its output shaft 43 in a given direction in response to energization of one pair of input terminals until a predetermined amount of resistance to rotation is incurred, and when this happens the output shaft is stopped and the motor is de-energized. Subsequent energization of another pair of input terminals of the motor will cause it to rotate in the opposite direction until it is again stopped by the exertion of output torque in excess of a predetermined amount. By reason of these characteristics, the motor is not only effective to open and close the shutter by rotating it about its pivot point 40, but also the use of a motor of this type ensures that actuation of the shutter 29 will cease whenever any obstacle is encountered. Thus, if any object is interposed in the path of the shutter 29, no damage will result since the motor will promptly cease operation and the shutter will remain in the position to which it has then been actuated, and a subsequent re-energization of the motor 30 restores the shutter 29 to its original position.

Rotation of the output shaft 43 in the clockwise direction as viewed from above in FIGURE 4 causes member 41 to rotate clockwise also since such member is directly secured to shaft 43. This rotation of member 41 will cause the link 42 to rotate shutter 29 in a clockwise direction about its pivot 40. Rotation of the output shaft 43 in the opposite direction will, in an analogous manner, cause the shutter 29 to rotate clockwise back to the position shown in FIGURE 4. A plunger-actuated switch 42a is secured to cover 32 and is closed by plate 42b mounted on shutter 29 only when the latter is in the closed position.

Figure 5:
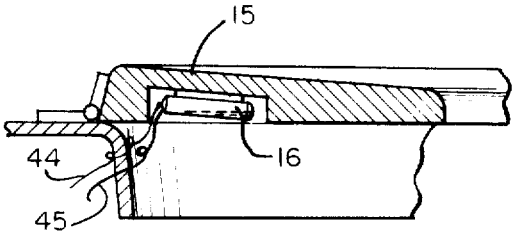
FIGURE 5 is a sectional view of the toilet seat illustrating particularly the arrangement of the switch position within the seat.
Figure 6:
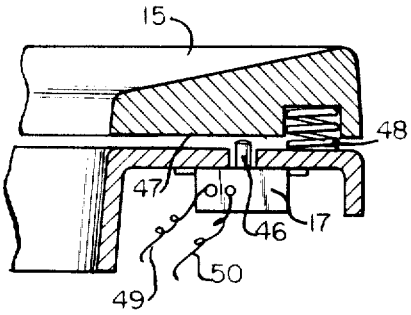
FIGURE 6 is a sectional view illustrating the manner in which a further switch is actuated by depressing the seat.

FIGURES 5 and 6 illustrate the switches 16 and and 17 which have already been referred to in connection with FIGURE 1. The switch 16 of FIGURE 5 is preferably a mercury type switch which is embedded in the seat and is thus responsive to the position of the seat, i.e. whether it is in the horizontal or raised, vertical position. With the seat in the horizontal position as shown, a circuit remains incomplete between wires 44 and 45; however, when the seat is raised, a circuit between these same wires is then completed.

With reference to FIGURE 6, the push-button switch 17 is actuated whenever the plunger 46 is depressed by the immediately opposite or bottom surface 47 of seat 15. A small coil spring 48 which is embedded within the bottom surface of seat 15 maintains the seat 15 sufficiently raised when only its own weight rests upon plunger 46 so that the plunger 46 is normally not depressed and the circuit between the wires 49 and 50 remains open. However, when a suitable force is exerted downwardly upon the seat 15, the resistance of the spring 48 is overcome so that plunger 46 is forced downwardly and a circuit is then completed between wires 49 and 50.

Figure 7:
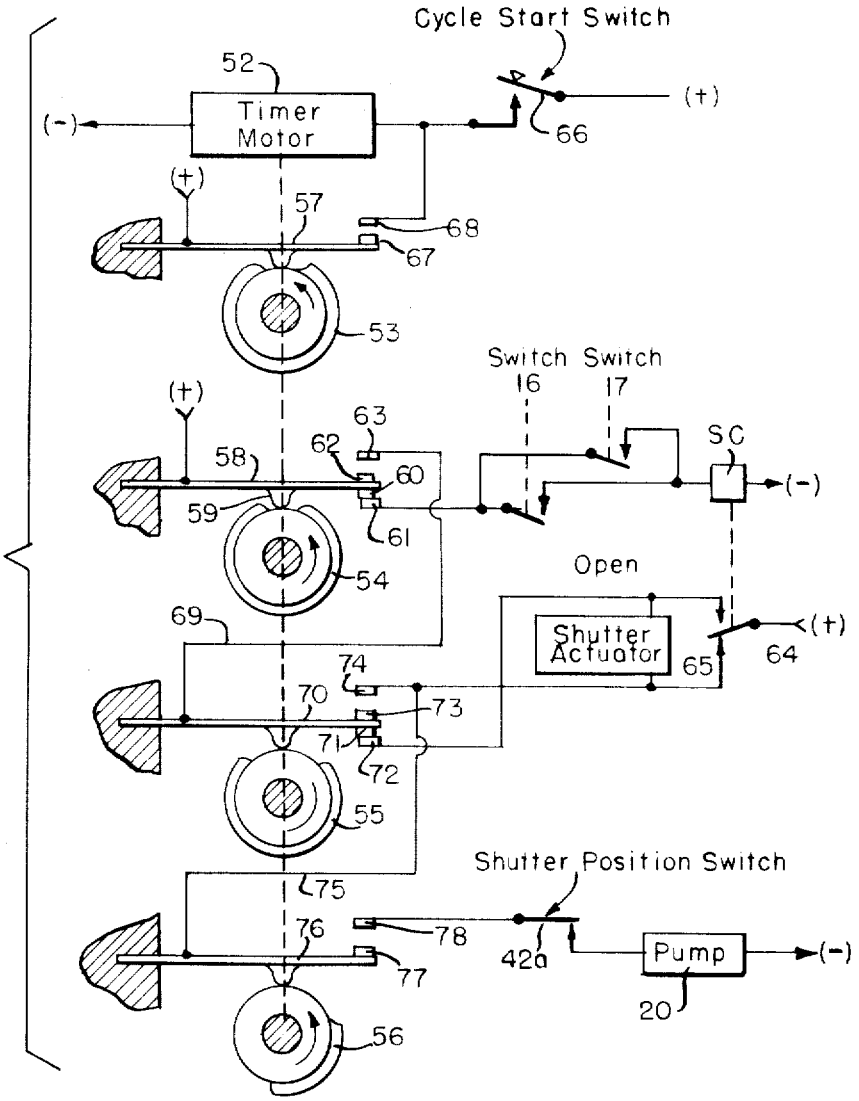
FIGURE 7 is a schematic view of the electromechanical programmer used in the control of the flushing cycle.
Figure 8:
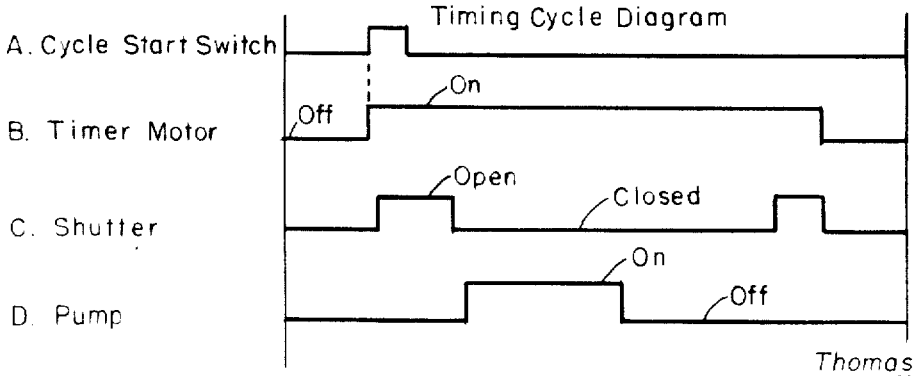
FIGURE 8 is a timing cycle diagram illustrating graphically the various steps of the cycle as controlled by the programmer of FIGURE 7.

The construction and mode of operation of the programmer of FIGURE 7 and the corresponding time cycle diagram of FIGURE 8 will best be understood from the standpoint of a description of the mode of operation of the toilet of this invention. FIGURE 7 discloses a timer motor 52 which is normally de-energized and has associated therewith a plurality of timing cams 53–56. Associated with each timing cam is a switch contact comprising an armature such as the armature 57 associated with cam 53 and armature 58 associated with cam 54. Considering armature 58, its detent 59 normally abuts the low point or recess in cam 54 with the result that a circuit is completed between contact 60 on armature 58 and fixed contact 61. When the cam member 54 rotates in a counterclockwise direction from the position shown in FIGURE 7, it is obvious that the circuit between contacts 60 and 61 will be opened and instead a circuit will be completed between contact 62 and fixed contact 63.

When the timer motor 52 is in the at-rest position shown in FIGURE 7, no circuit can be completed to energize the shutter control relay SC because both switch contacts 16 and 17 are then open since, under normal conditions, the seat 15 is down and there is no downward force exerted upon the seat to close switch 17. Relay SC is therefore normally de-energized with the result that its back contact 64 is closed and an input is then applied from the (+) terminal through this back contact 64 to the "Closed" input of shutter actuator 65, thereby ensuring that shutter 29 is normally in the closed position.

If it is intended that the toilet shall be used for the deposit of waste material therein, it is contemplated that either the seat 15 will be raised to close switch 16, or else a downward force will be exerted upon the seat so as to close switch 17. In either event, a circuit is then completed through the closed contact points 60 and 61 associated with cam 54 for the energization of relay SC. This causes the front contact 64 of relay SC to be closed so that input energization is then applied to the "Open" input of the shutter actuator 65, wherefore the shutter 29 will then immediately be operated to the open position. With the shutter in the open position, any waste materials, either liquid or solid, which are deposited within the bowl 21 may readily pass directly into the container 28.

After use of the toilet, the pre-programmed flush cycle controlled by the apparatus of FIGURE 7 may be put into effect, and this is initiated by the momentary closure of a push-button contact 66 which is illustrated diagrammatically in FIGURE 7 and is also illustrated in FIGURE 1 as being positioned upon the top surface of lid 11 where it is readily accessible to the user. As soon as the contact 66 is closed (see line A of FIGURE 8), energy is applied to the timer motor 52 to start the operation thereof and revolve each of the cams 53–56 in the counterclockwise direction.

As soon as cam 53 has rotated a small number of degrees from the position shown in FIGURE 7, armature 57 is raised to thereby close contacts 67 and 68 and provide an alternate circuit for the energization of timer motor 52. It can be seen, therefore, that the continued operation of timer motor 52, after having been set into operation by the momentary closure of push-button contact 66, will continue through a complete cycle of operation or until the cam 53 returns to the position shown in FIGURE 7, whereupon the contacts 67 and 68 are again opened to de-energize motor 52.

As soon as cam 54 has rotated a few degrees counterclockwise from the position shown in FIGURE 7, contacts 60 and 61 are opened as the result of the raising of armature 58, and this means that control of the shutter is, in effect, taken away from the switches 16 and 17 which have heretofore controlled the shutter. Instead, energy is now applied through the closed contacts 62 and 63 to lead 69 which therefore supplies energy to armature 70 associated with cam 55. This electrical energy is initially applied through closed contacts 71 and 72 to the "Open" input of the shutter actuator 65, thereby immediately opening the shutter 29 (line C, FIGURE 8) if it has not already been left in the open position during the time that the shutter was subject to control of switches 16 and 17.

It will be noted that cam 55 is not effective to raise the associated armature 70 until after timer motor has rotated somewhat beyond the position where armature 58 was previously raised by its corresponding cam 54. This means that the circuit through closed contacts 71 and 72 will remain completed for a predetermined time and until armature 70 is raised, whereupon contact points 73 and 74 are closed so that energy is instead applied to the "Closed" input of shutter actuator 65 to thereby close the shutter. In other words, at the beginning of the cycle, the shutter 29 is first operated to the open position and thereafter closed, and this is done to ensure that any waste materials which may have been placed in the bowl will be permitted to fall into the waste receptacle 28. Under normal circumstances, such waste materials would have fallen into the receptacle 28 in any event because the shutter 29 would have been opened by either the raising of the lid or the pressing down of the lid which results in the actuation of switch 17. However, if waste materials had been placed in the bowl without the shutter 29 having been opened by the operation of either switch 16 or 17, it is then assured that, in any event, the shutter will be opened momentarily at the beginning of the cycle for a brief interval such as ten seconds to ensure that any waste materials then in the bowl will first be deposited in the waste receptacle 28. This opening and subsequent closure of the shutter is illustrated at line C of FIGURE 8.

Throughout the time that armature 70 is raised by cam 55, electrical energy is also applied to lead 75 extending to armature 76 which is associated with cam 56. As can be seen, the contour of cam disc 56 is such that armature 76 is raised to close a circuit between contacts 77 and 78 a brief time after the closure of contacts 73 and 74 associated with armature 70. Because of this arrangement, a circuit is completed to energize pump 20 a short time, i.e. a few seconds, after the shutter has been closed as can be seen by comparing lines C and D of FIGURE 8. The circuit for the energization of pump 20 includes a contact 42a of a shutter-position switch which is closed only when shutter 29 is fully closed. The reason for the inclusion of this contact in the circuit for the energization of pump 20 is to prevent energization of the pump when the shutter is open since, if this were to occur, the flush water would all run directly into the receptacle 28 rather than flow out through the apertures 34 (FIGURE 3) and then return over the top of upper wall 32 back to the flush water reservoir 35.

The contour of cam disc 55 is selected to maintain pump 20 energized for a suitable time such as twenty seconds. Throughout this interval, flush water under pressure from the pump 20 swirls around the annular space 25 (see FIGURES 2 and 3) and rinses the interior of bowl 21, with substantially all of the flush water returning to the reservoir 35. Since the flush water is substantially all returned to the reservoir, only a relatively small quantity of flush water need be employed. For example, in one actual embodiment of this invention, a quantity of flush water amounting to approximately six quarts was placed in the reservoir; however, because of the ability with the present invention to re-use the flush water repeatedly, a single rinsing of the bowl employed the equivalent of three gallons of water, thereby ensuring that the bowl was thoroughly rinsed after each usage.

At the conclusion of the pumping operation, the contacts 77 and 78 open to de-energize pump 20. Although the pump is deenergized at this time so that no further flushing action occurs, it will be noted that the shutter 29 remains closed for a substantial length of time thereafter as can be seen at line C of FIGURE 8. The delay in opening of the shutter results from the fact that the contour of cam 55 does not permit armature 70 to be lowered until some significant time after armature 76 was lowered by its associated cam 56. The reason for this is to provide sufficient time for all of the flush water in the bowl to pass through the aperture 34 and return to the flush water reservoir 35. Sufficient time must be allowed for this since, as previously explained, tissue paper or the like may partly obscure the apertures 34 so that the flush water is filtered therethrough, and it has been found that a time period in the order of twelve seconds should be provided after de-energization of the pump before the shutter 29 is permitted to open.

As can also be seen at line C of FIGURE 8, the shutter is opened toward the end of the cycle, and this is accomplished when cam 55 has rotated to a position in which armature 70 has been lowered to the position shown in FIGURE 7 so that contacts 71 and 72 are again closed, thereby providing an input to the "Open" terminal of the shutter actuator 65. The purpose of ensuring that the shutter is opened at this time is to permit any waste material, tissue paper, or the like which may have become lodged on the top surface of the shutter 29 as a result of the flushing operation to now be discharged into receptacle 28. Thus, as the shutter 29 opens, by swinging laterally about its vertical pivot point 40, any solid material which may be lying on its upper surface will effectively be removed therefrom and will naturally fall into the container 28.

Very shortly after the shutter 29 is operated to the open position in response to the rotation of cam 55, cam 54 will rotate to the position where it again causes the closure of contacts 60 and 61. This restores control of the shutter to the switches 16 and 17. Under normal circumstances, where the seat 15 has been restored to the down position, and there is no weight thereon which is effective to actuate switch 17, the shutter 29 will then open since both switch contacts 16 and 17 will be open thereby de-energizing relay SC and cause a circuit to be completed through its back contact 64 to supply energy to the "Closed" input of shutter actuator 65. On the other hand, if either switch contact 16 or 17 is closed, relay SC will be energized and a circuit will then be completed through front contact 64 of this relay to supply an input to the "Open" input of shutter actuator 65. In other words, at the end of the cycle, and until a subsequent cycle is initiated by operation of push button 66, the position of the shutter is controlled entirely by switches 16 and 17.

When it is desired to service the toilet of this invention, as at the end of a trip, it is only necessary that the receptacle 28 be emptied and that some make-up water (and disinfectant, if desired) be added to reservoir 35 to restore it to its original level. As previously mentioned, a flexible plastic liner or bag may be used in receptacle 28 to facilitate the removal of waste. Alternatively, a drain plug (not shown) may be provided at the bottom of receptacle 28, and this is especially advantageous when it is desired that the toilet shall be emptied from the exterior of the vehicle.

Figure 9:
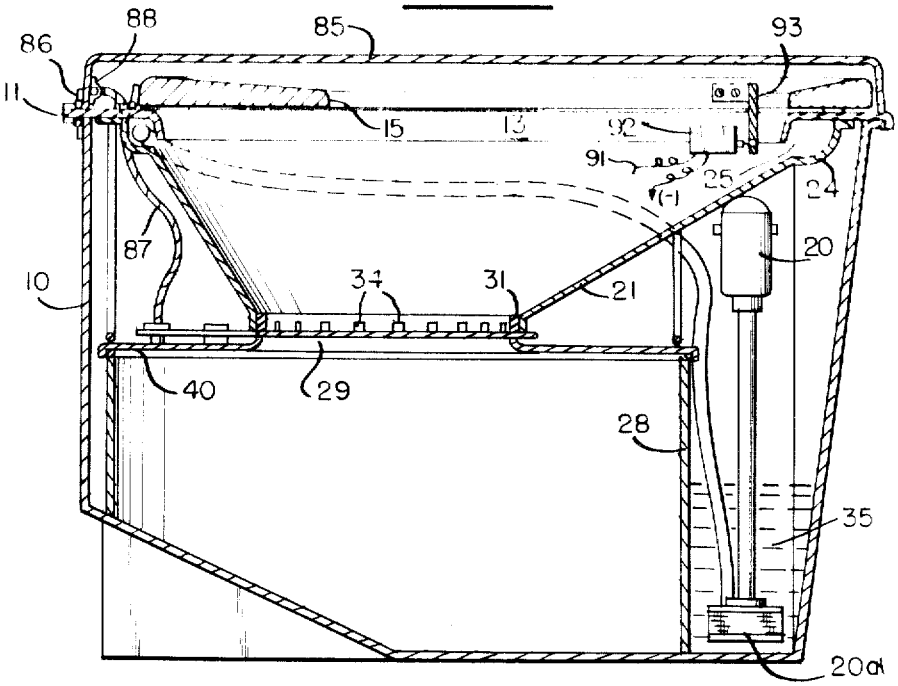
FIGURE 9 is a side cross-sectional view of a modified form of the flush toilet of this invention.
Figure 10:
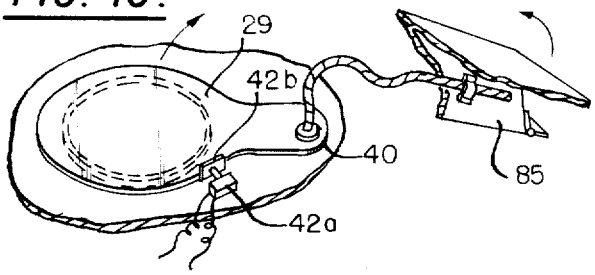
FIGURE 10 is a diagrammatic view of the shutter actuating mechanism of the modified form of the invention shown in FIGURE 9.
Figure 11:
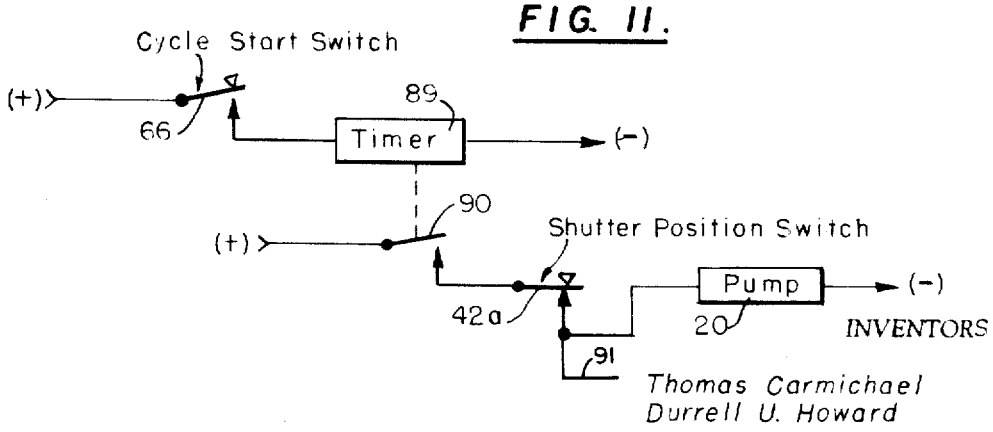
FIGURE 11 is a circuit diagram for the control of the pump in the embodiment of the invention illustrated in FIGURES 9 and 10.

The modified form of the invention illustrated in FIGURES 9–11 is particularly adapted for use in camping trailers, boats, etc. where simplicity of construction and thus economy of the entire unit is an important factor. In this modified form, it becomes possible to dispense with the shutter actuating motor 30 and to substitute for the programmer 18 a simple interval timer.

FIGURE 9 corresponds in considerable part with the illustration of FIGURE 2. However, it is to be noted that in FIGURE 9 the motor 30 for actuating the shutter and also the programmer 18 have been eliminated. However, there has been added a cover 85 which is hinged to the top of member 11 by a hinge 86, and cover 85 is adapted to cover the seat 15 entirely when in its lowered position.

In FIGURE 9, the shutter 29 is mechanically actuated by the raising or lowering of cover 85. The mechanical coupling between cover 85 and shutter 29 may take any of numerous different forms, such as, for example, a flexible coupler 87 which has one end thereof affixed to the inner surface of cover 85 near hinge 86 by a suitable bracket or clamp 88. The opposite end of coupler 87 is secured to shutter 29 adjacent its pivot 40. Normally, when cover 85 is in the lowered position shown in FIGURE 9, shutter 29 is in the closed position; however, when the cover 85 is raised, thereby turning or rotating the upper end of coupler 87, a turning force is exerted on shutter 29 at the location of its pivot 40, thereby opening the shutter. In other words, whenever cover 85 is raised, the shutter 29 is simultaneously opened; and when cover 85 is lowered, shutter 29 is simultaneously operated to the closed position.

The interconnection between the cover 85 and shutter 29 is illustrated diagrammatically in FIGURE 10. Thus, it will be apparent that rotation of cover 85 in the direction of the arrow will tend to produce a clockwise rotation of shutter 29 about its pivot 40. When shutter 29 is in the closed position as shown in FIGURE 10, member 42b exerts a pressure against the plunger of switch 42a thereby closing a circuit through the switch; whereas, when shutter 29 is not fully closed, the circuit through the switch contact of switch 42a is then opened.

FIGURE 11 illustrates a circuit diagram which may be used for control of the pump 20 of FIGURE 9. When the contact 66 of the cycle start switch is closed even momentarily, energy is applied to a timer 89 which then demarcates a predetermined time interval during which an associated contact 90 is closed. During the time that contact 90 is closed, electrical energy is applied through this closed contact 90 and through the shutter position switch contacts 42a to energize pump 20, and the length of time that pump 20 remains energized is dependent upon the contact closure time of contact 90 as determined by timer 89. The inclusion of the contact 42a in the circuit for pump 20 ensures that pump 20 cannot be operated unless the shutter 29 is fully closed.

During the time that contact 90 is closed by timer 89, electrical energy is also available on lead 91, and this energy is applied to a solenoid actuated electrical latch 92 which locks cover 85 in the down position as a result of its engagement with a latch member 93.

In operation, the flush toilet of FIGURE 9 is normally maintained with the cover 85 in the down position as shown. When the cover is raised, the shutter 29 is simultaneously opened to permit waste matter to pass directly from the interior of bowl 21 to the waste storage receptacle 28. When the cover 85 is lowered, the shutter 29 is simultaneously operated to the closed position. Thereafter, when the cycle start switch 66 is actuated, the pump 20 will operate for a predetermined interval, thereby flushing the interior of bowl 21, and with the flush water being substantially all returned to the flush water reservoir 35 because of the closed condition of shutter 29. Throughout this period of flushing, the cover 85 cannot be raised because of the locking action of solenoid operated latch 92, thereby positively preventing the opening of shutter 29 when pump 20 is in operation. However, when the pump 20 has stopped operating, the latch 92 is released so that the flush toilet can again be used.

The cover 85 may, if desired, be made of a transparent material as this may be of advantage of users in order to demonstrate clearly to them that the toilet is of the type in which a flushing operation takes place using a substantial quantity of a flushing fluid. Of course, an opaque cover can also be used.

Having described an improved flush toilet for vehicles as one specific embodiment of our invention, we desire it to be understood that the form shown may be modified to meet the requirements of practice without limiting the scope of our invention which is defined by the appended claims. More particularly, in the specific embodiment of the invention disclosed herein, an electromechanical programmer has been shown, but it should be understood that an electronic programmer may be used as well.

What we claim is:

1. A flush toilet for use in vehicles or the like comprising in combination, a toilet bowl having a bottom outlet, a receptacle positioned below said bowl for receiving liquid and solid wastes admitted to said bowl and passing through said bottom outlet, closure means operable between open and closed positions for selectively permitting solid and liquid wastes to pass from said bowl to said *receptacle* [reservoir],

*said closure means comprising an essentially flat plate which is moveable in its own plane to provide thereby unrestricted communication between said bowl and said waste receptacle when said closure means is in its open position.* a separate reservoir for flushing *fluid* [fluids], *said reservoir having an open top which is laterally disposed about said closure means in its closed position,* a pump for forcing said fluid from said reservoir to said bowl to flush said bowl, means for providing a return flow path for said flushing *fluid* [medium] from said bowl to said reservoir bypassing said receptacle when said closure means is in its closed condition,

*said means for providing a return flow path including at least one aperture in the annular side wall of said bowl adjacent said bottom outlet and above said closure means,*

*said receptacle having an inlet opening therein which is vertically aligned with said bottom outlet so that waste matter deposited in said bowl can readily pass through to said receptacle when said closure means is in its open position, said closure means in its closed position blocking communication with said receptacle inlet opening so that said flushing fluid can only flow over a fluid flow path extending from said reservoir to said bowl and thence through said aperture back to said reservoir.*

2. The apparatus of claim 1 which further includes means for permitting operation of said pump only when said closure means is in its closed condition.

3. The toilet of claim 1 which further includes a toilet seat operable between raised and lowered positions, first means responsive to the position of said seat, and second means responsive to a downward force exerted upon said seat, and means controlled by said first and second means for operating said closure means to its open condition when either said seat is raised or a downward force is exerted upon said seat and for operating said closure means to its closed position at other times.

4. The toilet of claim 1 in which said bottom outlet of said bowl has a planar rim and said closure means comprises a flat plate effecting a substantial sealing engagement with said rim when in the closed condition, and means for selectively revolving said plate in its own plane to thereby cause any solid material lying thereon to be removed therefrom and fall into said waste receptacle.

[5. The toilet of claim 1 in which said means for providing a return flow path comprises an annular element comprising a part of said bottom outlet of said bowl and having an upstanding wall defining therein a plurality of apertures each of a size to permit the passage of fluids while blocking the passage of most solids, and a top cover for said receptacle having an opening therein corresponding substantially with said bowl outlet and being aligned therewith while the remainder of said top cover forms a fluid flow surface for fluid flow from said apertures to said reservoir.]

[6. The toilet of claim 5 which includes an outer casing surrounding said receptacle, the space between the outer wall surface of said receptable and the inner wall surface of said casing comprising said separate reservoir.]

[7. The toilet of claim 6 in which said outer casing includes a hinged lid, and means for operatively securing together said bowl, and said annular element of said receptacle to said lid, whereby the raising of said hinged lid fully exposes said receptacle to facilitate the removal of solid and liquid wastes therefrom.]

8. The toilet of claim 1 which further includes means for operating said closure means between its closed and open conditions, and program control means for selectively operating said closure means and said pump, said control means when set into operation demarcating a successive plurality of discrete steps constituting a flushing cycle, and means governed by said control means for closing said closure means and only thereafter operating said pump throughout a selected one of said steps.

9. The toilet of claim 8 which includes means governed by said control means for maintaining said closure means in the closed condition for a predetermined time following operation of said pump and thereafter opening said closure means, whereby said flushing fluid is first permitted to pass over said return flow path to said reservoir and thereafter said closure means is open to permit solid wastes which have accumulated thereon during said flushing operation to pass into said receptacle.

10. The toilet of claim 1 which further includes control means for timing a plurality of predetermined intervals when set into operation which comprise a flushing cycle, means for initiating operation of said control means, said control means on its successive intervals controlling operation of said toilet as follows:

(a) opening said closure means, and, after a predetermined time, again closing said closure means;

(b) operating said pump for a predetermined time but only provided that said closure means is in the closed condition; and (c) maintaining said closure means closed for a predetermined time following cessation of pump operation and thereafter operating said closure means to the open condition.

11. The toilet of claim 10 in which said means for initiating operation of said control means comprises a manually operated switch.

12. A flush toilet comprising in combination, a toilet bowl having a bottom outlet, a receptacle disposed to receive waste materials passing from said bowl through said bottom outlet, a shutter for at times blocking communication between said bowl and said receptacle,

*said shutter comprising an essentially flat plate which is moveable in its own plane about an axis,* a source of flushing fluid *which at least in part surrounds said receptacle,* means for controlling said source to provide said flushing fluid *to flush said bowl* only when said shutter is closed,

*said receptacle having a top surface defining an aperture therein which generally corresponds to and is aligned with said bottom outlet,* and means for recirculating said flushing fluid over a flow path which bypasses said receptacle when said shutter is closed,

*said fluid flow path including an annular element comprising a part of said bottom outlet of said bowl and having an upstanding wall defining therein at least one aperture of a size to permit the passage of fluids while blocking the passage of most solids.*

13. The flush toilet of claim 12 which includes a pump for circulating said fluid under pressure through said bowl.

14. The flush toilet of claim 12 which includes means adjacent said bottom outlet and above said shutter defining therein a plurality of apertures permitting the flow therethrough of fluid only when said shutter is closed and preventing fluid flow directly into said receptacle.

15. The flush toilet of claim 14 which further includes means defining the top enclosing surface of said receptacle for conveying said flushing fluid to a fluid reservoir exterior of said receptacle.

16. The flush toilet of claim 14 in which said apertures extend substantially to the upper surface of said shutter when said shutter is in the closed positions, whereby any flushing fluid on said shutter passes through said apertures and over said flow path which bypasses said receptacle.

17. The flush toilet of claim 12 which includes manually operable means for actuating said shutter.

18. The flush toilet of claim 12 which includes a top cover for said toilet rotatable about a hinge to raised and lowered positions, said cover in its lowered position blocking access to said bowl, and means responsive to said cover in its lowered position for operating said shutter to its blocking position and responsive to said cover in its raised position for operating said shutter to a non-blocking position.

19. The flush toilet of claim 18 in which said responsive means comprises a mechanical coupling means operatively connecting said cover to said shutter.

20. The flush toilet of claim 18 which includes latching means controlled at least in part by said recirculating means for preventing the movement of said cover to its raised position when said recirculating means is in operation.

21. The flush toilet of claim 18 which includes timer means for controlling the duration of operation of said recirculating means, and means for initiating operation of said timer means.

22. The combination of claim 1 which further includes means responsive to operation of said pump for preventing operation of said closure means to its open position during pump operation.

References Cited

The following references, cited by the Examiner, are of record in the patented file of this patent or the original patent.

UNITED STATES PATENTS

| | | | |
|---|---|---|---|
| 367,495 | 8/1887 | Angell | 4—130 |
| 1,303,358 | 5/1919 | Montgomery | 4—115 |
| 1,558,705 | 10/1925 | Milligan | 70—280 |
| 1,635,028 | 7/1927 | Burr et al. | 70—280 |
| 2,086,066 | 7/1937 | Churchill | 4—213 |
| 2,122,687 | 7/1938 | Herrmann | 4—213 |
| 2,740,971 | 4/1956 | Weekes | 4—115 |
| 3,042,933 | 7/1962 | Garver | 4—115 |
| 3,067,433 | 12/1962 | Dietz et al. | 4—115 |
| 3,172,131 | 3/1965 | Herkenhine et al. | 4—115 |
| 3,249,950 | 5/1966 | Wilson | 4—112 |
| 3,289,214 | 12/1966 | Corliss | 4—115 |
| 3,319,263 | 5/1967 | Udden et al. | 4—112 |
| 1,294,747 | 2/1919 | Zabawa | 4—143 |

FOREIGN PATENTS

| | | |
|---|---|---|
| 6,836 | 9/1835 | Great Britain. |
| 163,143 | 9/1952 | Australia. |
| 1,323,648 | 3/1963 | France. |
| 1,190,408 | 4/1965 | Germany. |

WILLIAM I. PRICE, Primary Examiner

D. B. MASSENBERG, Assistant Examiner